Jan. 12, 1926.

G. B. HILL

LIFTER FOR ICE CREAM CANS

Filed April 9, 1925

1,569,126

INVENTOR.
G. B. Hill.
BY Watson E. Coleman ATTORNEY

Patented Jan. 12, 1926.

1,569,126

UNITED STATES PATENT OFFICE.

GUY B. HILL, OF ONEIDA, WISCONSIN.

LIFTER FOR ICE-CREAM CANS.

Application filed April 9, 1925. Serial No. 21,949.

*To all whom it may concern:*

Be it known that I, GUY B. HILL, a citizen of the United States, residing at Oneida, in the county of Outagamie and State of Wisconsin, have invented certain new and useful Improvements in Lifters for Ice-Cream Cans, of which the following is a specification, reference being had to the accompanying drawings.

This invention relates to devices for lifting ice cream cans from packed ice cream tubs and cabinets and in ice cream factories, and the object of the invention is to provide a device of this kind which comprises two opposed jaws adapted to close upon the upper end of the ice cream can, and provide means whereby these jaws will automatically close upon the can as strain comes upon them.

A further object in this connection is to provide jaws so constructed that the jaws, when closed, will hold the lid on the cans and at the same time the extremities of the jaws will bind upon and clamp beneath the rim of the can so as to keep the can from slipping and enable the operator to obtain a strong and firm hold on the can.

My invention is illustrated in the accompanying drawing, wherein:—

Figure 5:
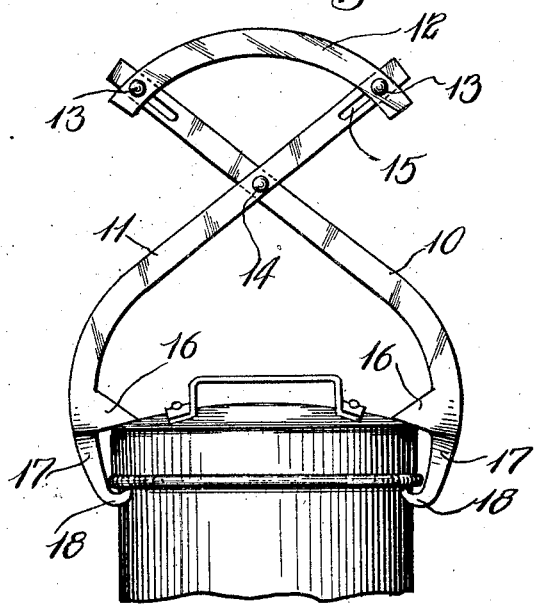
Figure 5 is a side elevation showing the manner in which the device is used.

Referring to this drawing, it will be obvious that my device is constructed in three parts, namely the two jaws 10 and 11 and the handle 12. This handle 12 is curved, as will be seen, and carries bolts or pins 13 at its extremities. The shanks 10 of the jaws are pivoted to each other by means of a transverse bolt 14. The upper extremities of the jaws are longitudinally slotted, as at 15, and the bolts 13 will operate in these slots. Thus it will be obvious that when the jaws are open, as shown in Figure 5, and strain is placed upon the handle and the jaws are engaged with an ice cream can that the handle will move upward and that the bolts 13 operating within the slots 15 will cause the jaws to close.

Figure 1:
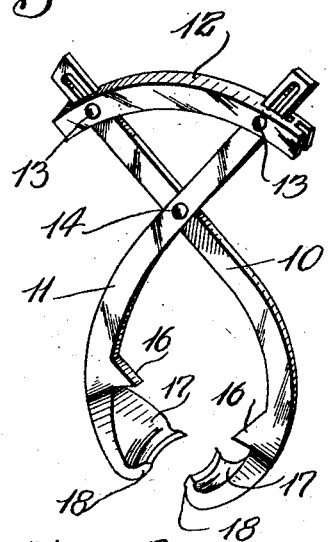
Figure 1 is a perspective view of a lifter constructed in accordance with my invention.
Figure 2:
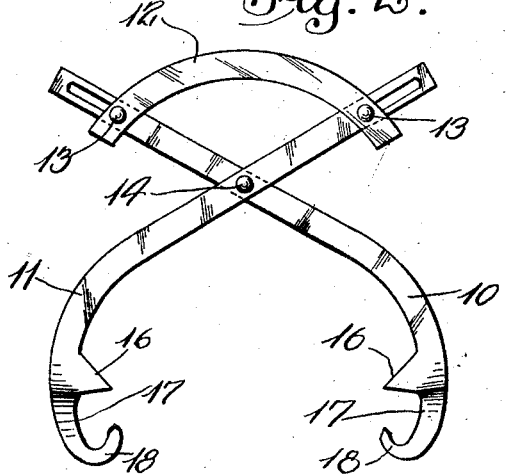
Figure 2 is a front elevation thereof.
Figure 3:
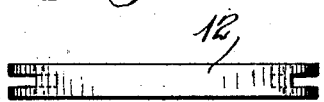
Figure 3 is a top plan view of the handle 12.
Figure 4:
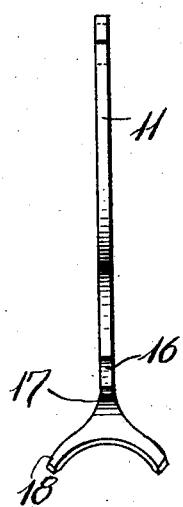
Figure 4 is an edge elevation of the blade 11.

The handle is preferably bifurcated at its ends, as shown in Figure 3, so as to receive the upper ends of the shanks 10 and 11 and the bolts 13 cross the forks of the handle. The lower portion of each of the jaws 10 and 11 is curved downward and inward and above the lower extremity of each jaw there is provided the outwardly projecting lug 16 which has a lower face which is at right angles to this portion of the shank. The shank below this lower face extends downward and inward in a curve and is formed with a flattened extremity 17 which preferably is recessed at 18, the flattened extremity being at right angles to the plane of movement of the jaws.

The triangular lugs 16 are for the purpose of keeping the lid on the ice cream can when lifting force is applied thereto and the claws formed by the recess 18 at the lower end of the jaws are adapted to clamp beneath the bottom of the can and keep the can from slipping and thus enable the operator to obtain a firm hold on the can.

It will be seen that the device is very simple and has been found extremely effective in practice. The recess 18 defines a pair of teeth on each jaw which grip the can tightly under the rim of the can. Preferably these jaws are at the point 17 about one and a half inches in width. There is no danger of the can slipping when lifting force is applied to the handle and inasmuch as the handle 12, when pulled up, causes the automatic closing of the jaws and when forced down positively opens the jaws, the device may be handled with one hand.

I claim:—

1. A lifter for cans comprising two crossed jaw shanks, the upper ends of which are longitudinally slotted, the lower ends of which are curved downward and inward toward each other and formed with terminals adapted to engage beneath the rim of an ice cream can and the shanks just above said terminal ends being formed with forwardly projecting lugs adapted to engage over the lid of the can.

2. A lifter for cans comprising crossed jaw shanks pivoted to each other, the lower ends of the jaw shanks being turned inward and formed at their lower ends with claws disposed in a plane at right angles to the planes of the jaw shanks, the inside faces of the jaw shanks just above said claws being formed with inwardly projecting lugs, the upper ends of the jaw shanks being longitudinally slotted, and a curved handle forked at its ends to embrace the upper ends of the shanks and having bolts passing through said slots.

3. A lifter for cans comprising crossed jaw shanks pivoted to each other, the lower ends of the jaw shanks being turned inward and formed with flattened portions medially recessed to provide claws, the flattened portions being disposed in a plane at right angles to the plane of the jaw shanks, the inside faces of the jaw shanks above said claws being formed with inwardly projecting lugs, the upper ends of the jaw shanks being longitudinally slotted, and a curved handle forked at its upper ends to embrace the upper ends of said shanks and having members passing through said slots.

In testimony whereof I hereunto affix my signature.

GUY B. HILL.